J. L. SAUNDERS.
HORSE HAY-FORK.

No. 177,286.  Patented May 9, 1876.

WITNESSES
Samuel D. Kelley.
James A. Todd.

INVENTOR.
James L. Saunders.
By Porter & Hutchinson, attys.

N. PETERS, PHOTO-LITHOGRAPHER, WASHINGTON, D. C.

UNITED STATES PATENT OFFICE.

JAMES L. SAUNDERS, OF BLUE HILL, MAINE.

IMPROVEMENT IN HORSE HAY-FORKS.

Specification forming part of Letters Patent No. 177,286, dated May 9, 1876; application filed March 31, 1876.

*To all whom it may concern:*

Be it known that I, JAMES L. SAUNDERS, of Blue Hill, in the State of Maine, have invented a Horse Hay-Fork, of which the following is a specification:

The object of my invention is to provide a hay-fork which may be operated by a horse or other power, and possess all the advantages which such an implement can confer, and which shall be simple in its construction, not liable to be out of repair, and which can be made and furnished at so low a price as to but slightly exceed that of a common fork.

Figure 1:
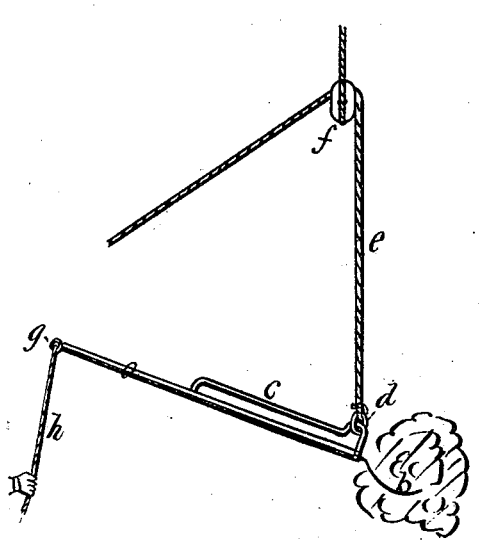
Figure 2:
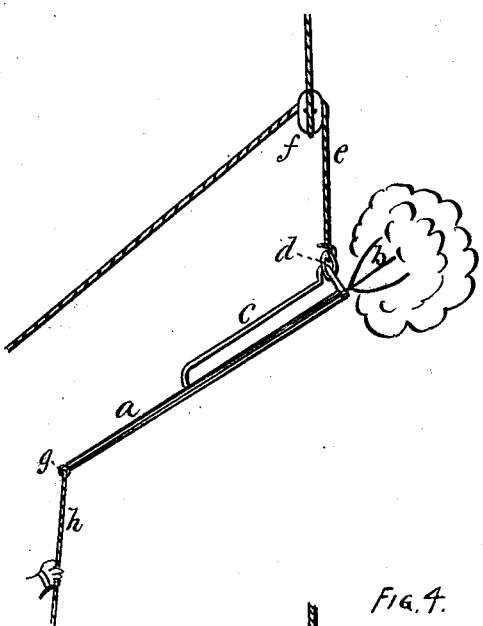
Figure 3:
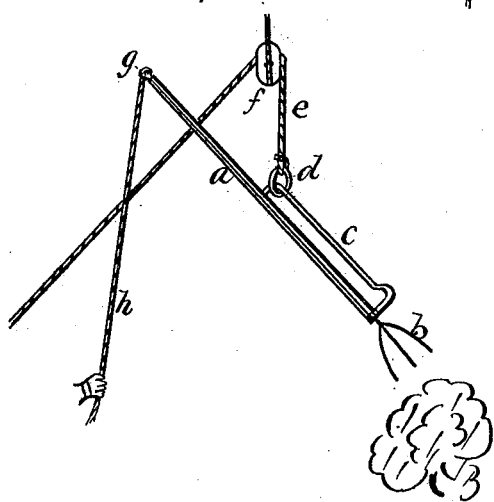
Figure 4:
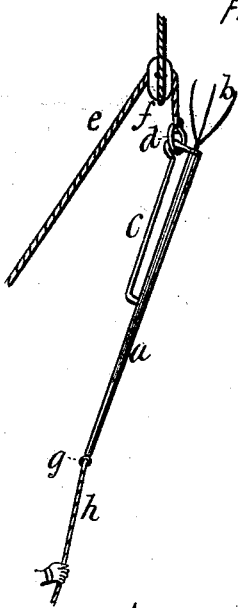

In the accompanying drawing, Figure 1 is a side elevation, showing the fork inserted in the hay ready for operation. Fig. 2 is a similar view, showing the fork elevating its load. Fig. 3 is a similar view, showing the load delivered; and Fig. 4 shows the fork returning to be reloaded.

In the drawings, $a$ represents the handle, and $b$ the metallic tines. $c$ is a clevis secured to the handle, and formed with an enlargement or curve near the tines, which serves as a seat for the traveling ring $d$, which moves upon the clevis. $e$ is a rope secured in ring $d$, and passing over a sheave in pulley $f$. $g$ is an eyebolt secured in handle $a$. In this eyebolt the hand-rope $h$ is secured, as shown.

The practical working of this fork is so easily deducible from the drawings that I will only state in brief that the operator inserts the tines in the hay, as shown in Fig. 1. The power is then applied to rope $e$, its ring $d$ being in the enlargement of clevis $c$, as shown in the figure, the operator in the meantime depressing the handle (by the hand-rope) until it is in the position shown in Fig. 2.

When the load is elevated to the desired height, the hand-rope is released and the fork assumes the position shown in Fig. 3, the load falling from the tines by its own weight. The operator then draws the fork back to himself, as shown in Fig. 4.

I claim as my invention—

A hay-fork consisting of and provided with the handle $a$, tines $b$, clevis $c$, traveling ring $d$, and eyebolt $g$, all substantially as described and shown.

JAMES L. SAUNDERS.

Witnesses:
JOSEPH D. LEACH,
THOMAS C. MITCHELL.